United States Patent
Huang

(10) Patent No.: US 8,030,908 B2
(45) Date of Patent: Oct. 4, 2011

(54) CONTROL METHOD FOR MULTI-PHASE DC-DC CONTROLLER AND MULTI-PHASE DC-DC CONTROLLER

(75) Inventor: Hua-Chiang Huang, Hsin-Chu (TW)

(73) Assignee: UPI Semiconductor Corporation, Taipei (TW)

( * ) Notice: Subject to any disclaimer, the term of this patent is extended or adjusted under 35 U.S.C. 154(b) by 723 days.

(21) Appl. No.: 12/153,769

(22) Filed: May 23, 2008

(65) Prior Publication Data

US 2009/0153110 A1    Jun. 18, 2009

Related U.S. Application Data

(60) Provisional application No. 61/013,589, filed on Dec. 13, 2007.

(51) Int. Cl.
*G05F 1/10* (2006.01)
*G05F 1/40* (2006.01)

(52) U.S. Cl. ......... 323/237; 323/240; 323/272; 323/284

(58) Field of Classification Search .................. 323/225, 323/237, 240, 246, 271, 272, 282, 284, 285
See application file for complete search history.

(56) References Cited

U.S. PATENT DOCUMENTS

| | | | |
|---|---|---|---|
| 6,414,470 B1 * | 7/2002 | Liu et al. | 323/272 |
| 6,683,441 B2 * | 1/2004 | Schiff et al. | 323/222 |
| 7,064,528 B2 * | 6/2006 | Jochum et al. | 323/266 |

* cited by examiner

*Primary Examiner* — Jessica Han
(74) *Attorney, Agent, or Firm* — Thomas|Kayden

(57) ABSTRACT

A multi-phase DC-DC controller. The multi-phase DC-DC controller comprises converter channels, a channel control device and a power control device. Each converter channel comprises a switch device, a first output node and an inductor coupled between the switch device and the first output node. The channel control device generates adjusted pulse width modulation signals according to control signals of the converter channels to respectively control operation of the switch device in each converter channel. The power control device generates the control signals according to sensed currents in the converter channels so as to dynamically turn on or off each converter channel according to the sensed currents.

26 Claims, 9 Drawing Sheets

US 8,030,908 B2

CONTROL METHOD FOR MULTI-PHASE DC-DC CONTROLLER AND MULTI-PHASE DC-DC CONTROLLER

CROSS REFERENCE TO RELATED APPLICATIONS

This application claims the benefit of U.S. Provisional Application No. 61/013,589, filed Dec. 13, 2007.

BACKGROUND OF THE INVENTION

1. Field of the Invention

The invention relates to a method for dynamically controlling a multi-phase DC-DC controller, and more particularly to a method for dynamically controlling a multi-phase DC-DC controller according to a respective or total channel loading current.

2. Description of the Related Art

Multi-phase DC-DC controllers (DC-DC converters) have been widely used in power supply circuits. A multi-phase buck converter typically employs a pair of MOSFETs connected in series for each phase as an output stage connected between a high voltage and a low voltage to produce a phase output. To obtain stable and balanced output, the output voltage and phase currents of a converter are sensed and fed back to the control circuit of the converter to produce suitable control signals to manipulate the MOSFETs of the output stage.

Nowadays, DC-DC controllers (DC-DC converters) are important in portable electronic devices such as cellular phones and laptop computers, which are primarily supplied with power from batteries. Such electronic devices often contain several sub-circuits with individual voltage level requirements, different than that supplied by a battery or an external voltage supply (sometimes higher or lower than the supply voltage, and possibly even a negative voltage). Additionally, battery voltage declines as stored power is drained. One method used to combat problems associated with the aforementioned, is to use switched DC-DC converters. Switched DC-DC converters increase voltage from a partially drained battery. By using switched DC-DC converters, volume of electronic devices can be decreased as less batteries would be required to achieve a same voltage supply effect.

BRIEF SUMMARY OF THE INVENTION

Multi-phase DC-DC controllers are provided. An exemplary embodiment of such a multi-phase DC-DC controller comprises converter channels, a channel control device and a power control device. Each converter channel comprises a switch device, a first output node and an inductor coupled between the switch device and the first output node. The channel control device generates adjusted pulse width modulation signals according to control signals of the converter channels to respectively control operation of the switch device in each converter channel. The power control device generates the control signals according to sensed currents in the converter channels so as to dynamically turn on or off each converter channel according to the sensed currents.

Another exemplary embodiment of such a multi-phase DC-DC controller comprises a first converter channel, a second converter channel, a first sensing device, a second sensing device, a channel control device and a power control device. The first converter channel comprises a first switch device, a first output node and a first inductor coupled between the first switch device and the first output node. The second converter channel comprises a second switch device, a second output node and a second inductor coupled between the second switch device and the second output node. The first sensing device is coupled to the first converter channel to sense a first current at the first output node. The second sensing device is coupled to the second converter channel to sense a second current at the second output node. A channel control device generates a first adjusted pulse width modulation (PWM) signal according to a first control signal to control operation of the first switch device, and generates a second adjusted PWM signal according to a second control signal to control operation of the second switch device. The power control device generates the first control signal according to the first current and generates the second control signal according to the second current so as to dynamically turn on or off the first converter channel and the second converter channel according to the first and second sensed currents.

An exemplary embodiment of a method for controlling operation of a multi-phase DC-DC controller is provided, wherein the multi-phase DC-DC controller comprises a plurality of converter channels turning on or off according to a plurality of adjusted pulse width modulation (PWM) signals, respectively, and comprises: detecting a loading current at an output node of each converter channel; comparing the loading current with a predetermined current to obtain a compared result; and generating the adjusted PWM signal of each converter channel according to the compared result.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
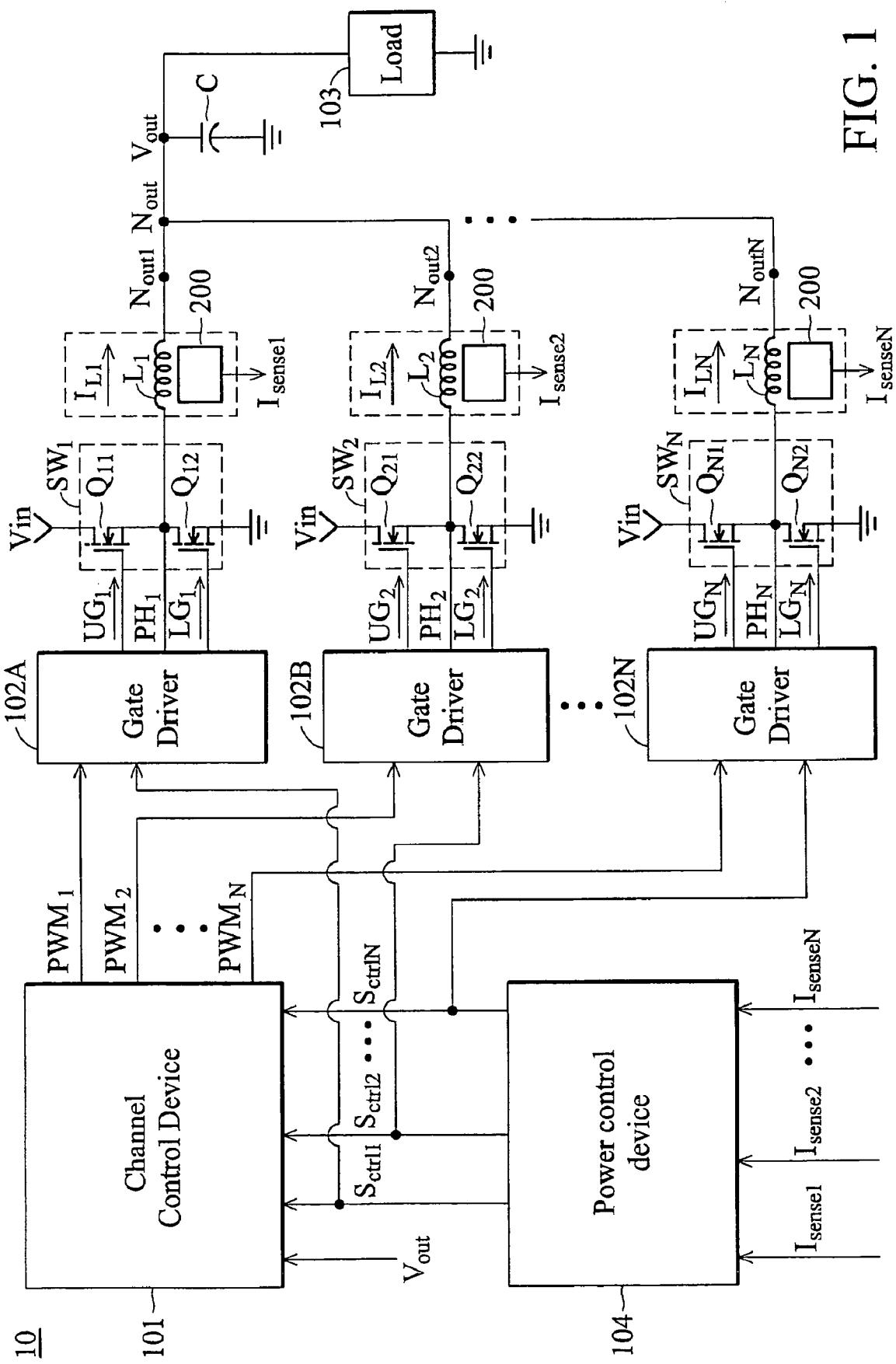
FIG. 1 is a block diagram of a DC-DC controller according to one embodiment of the invention.

FIG. 1 is a block diagram of a DC-DC controller 10 according to one embodiment of the invention. The DC-DC controller 10 is a multi-phase DC-DC controller with N converter channels to increase the driving capability of the circuit, wherein each converter channel comprises a switch device ($SW_1$, $SW_2$, ..., $SW_N$), an output node ($N_{out1}$, $N_{out2}$, ..., $N_{outN}$) and an inductor ($L_1$, $L_2$, ..., $L_N$) coupled between the switch device and the output node. The channel control device 101 outputs a plurality of PWM signals $PWM_1 \sim PWM_N$ to the gate drivers 102A~102N in each converter channel. The gate drivers 102A~102N enhance the received PWM signals $PWM_1 \sim PWM_N$ and output the enhanced PWM signals as a pair of PWM control signals ($UG_1$, $LG_1$), ($UG_2$, $LG_2$), ..., ($UG_N$, $LG_N$) to respectively control the operation of transistor pairs ($Q_{11}$, $Q_{12}$), ($Q_{21}$, $Q_{22}$), ..., ($Q_{N1}$, $Q_{N2}$) coupled between a reference input voltage Vin and the ground node in the switch devices $SW_1$, $SW_2$, ..., $SW_N$ of each converter channel, wherein the phases of the PWM control signals $UG_1 \sim UG_N$ are the same as the PWM signals $PWM_1 \sim PWM_N$ and are inverse to the PWM control signals $LG_1 \sim LG_N$. Each gate driver outputs the first PWM control signal $UG_n$ to the first transistor and the second PWM control signal $UG_n$ to the second transistor in the switch device of the $n^{th}$ channel according to the enhanced $PWM_n$ signals, to respectively control operations of the first transistor and the second transistor. One terminal of inductors $L_1 \sim L_N$ in each converter channel are coupled to the transistor pair at the node $PH_1 \sim PH_N$ and the other terminal of the inductors $L_1 \sim L_N$ are coupled to the output capacitor C at an output node $N_{out}$, respectively. The output voltage Vout of the DC-DC controller 10 is further coupled to the channel control device 101. Since the output voltage Vout may vary with the actual loading at load 103, to maintain stability of the output voltage Vout, the channel control device 101 adjusts the waveforms of the PWM signals $PWM_1 \sim PWM_N$ according to the feedback output voltage Vout. According to the embodiment of the invention, the channel control device 101 can further receive the control signals $S_{ctrl1} \sim S_{ctrlN}$ from a power control device 104 to dynamically control the on/off operation of the switch device in each converter channel according to the respective or total loading current of each converter channel. And the power control device 104 generates the control signals $S_{ctrl1} \sim S_{ctrlN}$ according to a plurality of sensed currents in each converter channels. For example, under a light loading, several converter channels may be turned off to improve system efficiency, while under a heavy loading, several converter channels may be turned on to increase driving capability. Thus, the multi-phase converter channels are dynamically and flexibly controlled according to the respective or total loading current of each converter channel. It should be noted that when the transistor pairs ($Q_{11}$, $Q_{12}$), ($Q_{21}$, $Q_{22}$), ..., ($Q_{N1}$, $Q_{N2}$) are configured inside of the integrated circuit, it is called the DC-DC converter. Alternatively, when the transistor pairs ($Q_{11}$, $Q_{12}$), ($Q_{21}$, $Q_{22}$), ..., ($Q_{N1}$, $Q_{N2}$) are configured outside of the integrated circuit, it is called the DC-DC controller. Thus, it should be understood that the proposed structure and control method are able to be applied to both of the DC-DC converter and DC-DC controller, and the invention should not be limited thereto.

Figure 2:
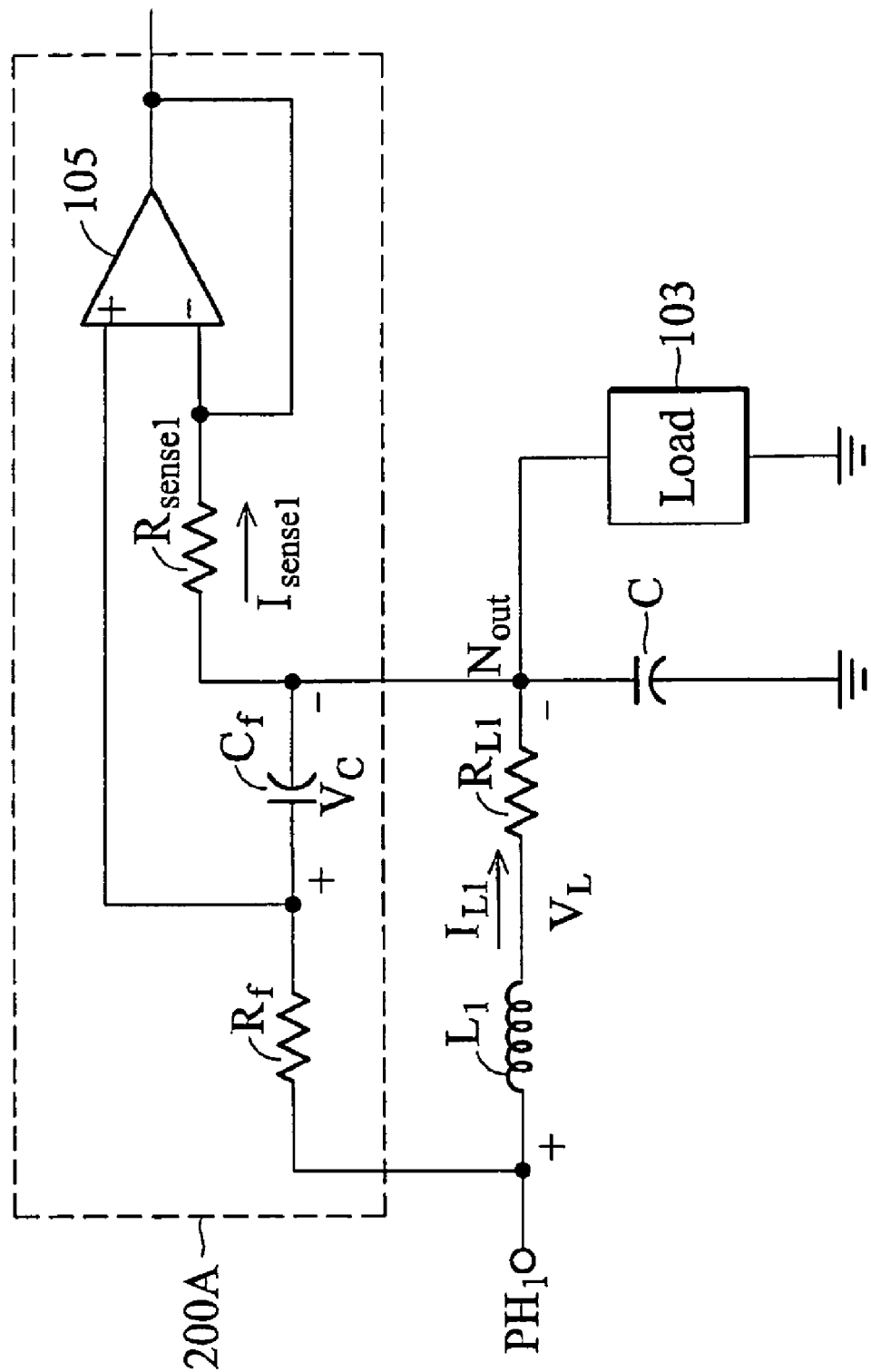
FIG. 2 illustrates an exemplary circuit of a current sensing device according to one embodiment of the invention.

As shown in FIG. 1, the power control device 104 receives a plurality of sensed current $I_{sense1} \sim I_{senseN}$, wherein the sensed current $I_{sense1} \sim I_{senseN}$ are sensed by a current sensing device 200 in each converter channel. The current sensing device senses the inductor current $I_{L1} \sim I_{LN}$ on the inductors $L_1 \sim L_N$ respectively through the voltage across the inductors $L_1 \sim L_N$ or the voltage at the node $PH_1 \sim PH_N$, and outputs the sensed current $I_{sense1} \sim I_{senseN}$, correspondingly. Thus, the sensed current $I_{sense1} \sim I_{senseN}$ will be proportional to the inductor current $I_{L1} \sim I_{LN}$, respectively. According to the embodiments, the current sensing device 200 can be the one used in the DC-DC controller for current balancing. FIG. 2 illustrates an exemplary circuit of a current sensing device 200A. As shown in FIG. 2, by taking the first converter channel as an example, the current sensing device 200A is coupled between the node $PH_1$ and the output node $N_{out}$ for sensing the inductor current $I_{L1}$ on the first converter channel. However, the current sensing device 200A can also be coupled to the other converter channels and it should be understood that the invention is not limited thereto. As shown in FIG. 2, the current sensing device 200A comprises a first resistor $R_f$ coupled to one terminal of the inductor $L_1$, a capacitor $C_f$ coupled between the first resistor $R_f$ and the output node $N_{out}$, a second resistor $R_{sense1}$ and an optional amplifier 105. The optional amplifier 105 comprises a first input node, a second input node and an output node, wherein the first input node is coupled to a connection node of the resistor $R_f$ and the capacitor $C_f$, and the second input node is coupled to the output node of the optional amplifier 105. The resistor $R_{sense1}$ is coupled between the second input node of the optional amplifier 105 and the output node $N_{out}$ wherein the sensed current is generated according to the current flowing through the resistor $R_{sense1}$.

Referring to FIG. 2, the voltage across the inductor $L_1$ is:

$$V_L = (R_{L1} + sL)I_{L1} \qquad \text{Eq. (1),}$$

where L is the inductor value of inductor $L_1$, s is the complex frequency and $R_{L1}$ is the equivalent series resistance (ESR) of inductor $L_1$. The voltage across the capacitor $C_f$ is:

$$V_C = \frac{V_L}{1 + sR_f C_f} \qquad \text{Eq. (2)}$$
$$= \frac{(R_{L1} + sL)I_{L1}}{1 + sR_f C_f}$$
$$= R_{L1}\left(\frac{1 + s(L/R_{L1})}{1 + sR_f C_f}\right)I_{L1}$$
$$= R_{L1}\frac{1 + sT}{1 + sT_1}I_{L1},$$

where $T = L/R_{L1}$ and $T_1 = R_f C_f$. Forcing $T = T_1$ yields $V_C = R_{L1} I_{L1}$. That is, when properly choosing $$R_f C_f = \frac{L}{R_{L1}},$$

voltage $V_C$ is directly proportional to $I_{L1}$. Next, the voltage $V_C$ across the capacitor $C_f$ is further coupled to an optional amplifier 105 with unit gain (the output node is coupled to one of the input node), and the current through the sense resistor $R_{sense1}$ can be the sensed current $I_{sense1}$ and is proportional to the inductor current $I_{L1}$.

Figure 3:
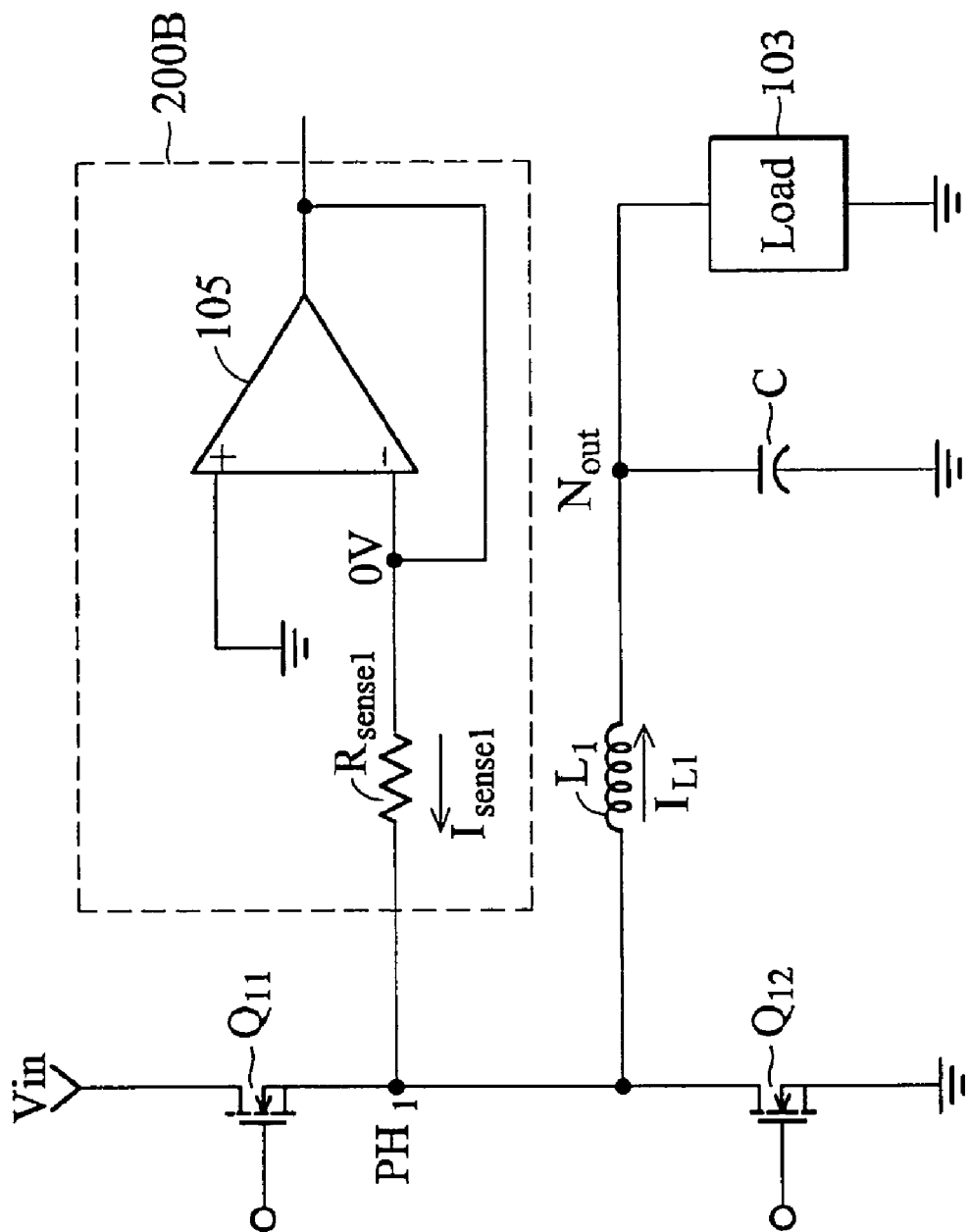
FIG. 3 illustrates an exemplary circuit of a current sensing device according to one embodiment of the invention

FIG. 3 illustrates another exemplary circuit of a current sensing device 200B. FIG. 3 also takes the first converter channel as an example, thus, the current sensing device 200B is coupled to the node $PH_1$ for sensing the inductor current $I_{L1}$ on the first converter channel. However, the current sensing device 200B can also be coupled to the other converter channels and it should be understood that the invention is not limited thereto. The current sensing device 200B comprises an optional amplifier 105 and a sensing resistor $R_{sense1}$. The optional amplifier 105 comprises a first input node, a second input node and an output node, wherein the first input node is coupled to a ground node, and the second input node is coupled to the output node. The sensing resistor $R_{sense1}$ is coupled between the second input node of the optional amplifier 105 and the node $PH_1$. As shown in FIG. 3, when the transistor $Q_{11}$ of the first converter channel is turned on and the transistor $Q_{12}$ is turned off, the inductor current $I_{L1}$ flows from the node $PH_1$ to the output node $N_{out}$ and the node $PH_1$ is with a positive voltage. Alternatively, when the transistor $Q_{11}$ of the first converter channel is turned off and the transistor $Q_{12}$ is turned on, since the current on an inductor will not change instantaneously, the current $I_{L1}$ still flows from the node $PH_1$ to the output node $N_{out}$ and the node $PH_1$ is with a negative voltage. Note that if the inductor current is sensed during the period when transistor $Q_{12}$ is turned on, a sense resistor $R_{sense1}$ coupled between the node $PH_1$ and an optional amplifier 105 could be used to simulate the equivalent resistor of the transistor $Q_{12}$. Thus, the current $I_{sense1}$ through the sense resistor $R_{sense1}$ would be proportional to the inductor current $I_{L1}$. The non-inverting terminal of optional amplifier 105 is coupled to the ground with 0V and the output node of optional amplifier 105 is further coupled to the inverting node for unit gain. Thus, the voltage at the inverting terminal will also be 0V. Since the node $PH_1$ is now with negative voltage and the voltage at the inverting terminal is 0V, the current $I_{sense1}$ flows from the inverting terminal of optional amplifier 105 to node $PH_1$ and will be proportional to the inductor current $I_{L1}$. As illustrated in FIGS. 2 and 3, the sensed current that is proportional to the inductor current $I_{L1}$ could be obtained according to the exemplary circuits. However, it should be understood that there are plenty of methods designed for sensing the inductor current of a DC-DC controller. Thus, the invention should not be limited thereto and the scope of the present invention shall be defined and protected by their equivalents.

Figure 4B:
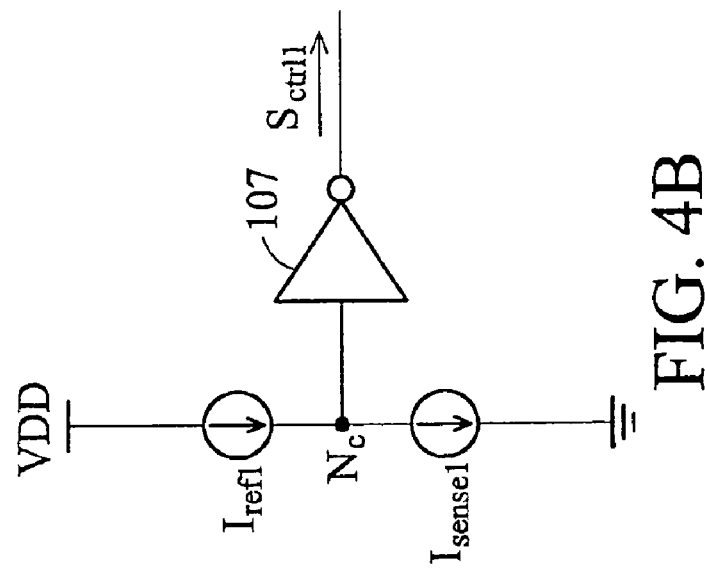
FIG. 4B illustrates another exemplary circuit for generating the control signal of the power control device according to another embodiment of the invention.
Figure 4A:
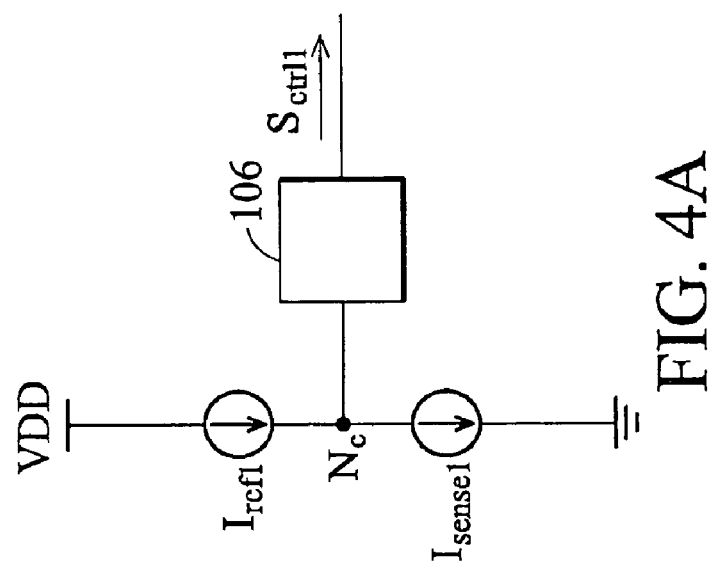
FIG. 4A illustrates an exemplary circuit for generating the control signal of the power control device according to one embodiment of the invention.
Figure 5:
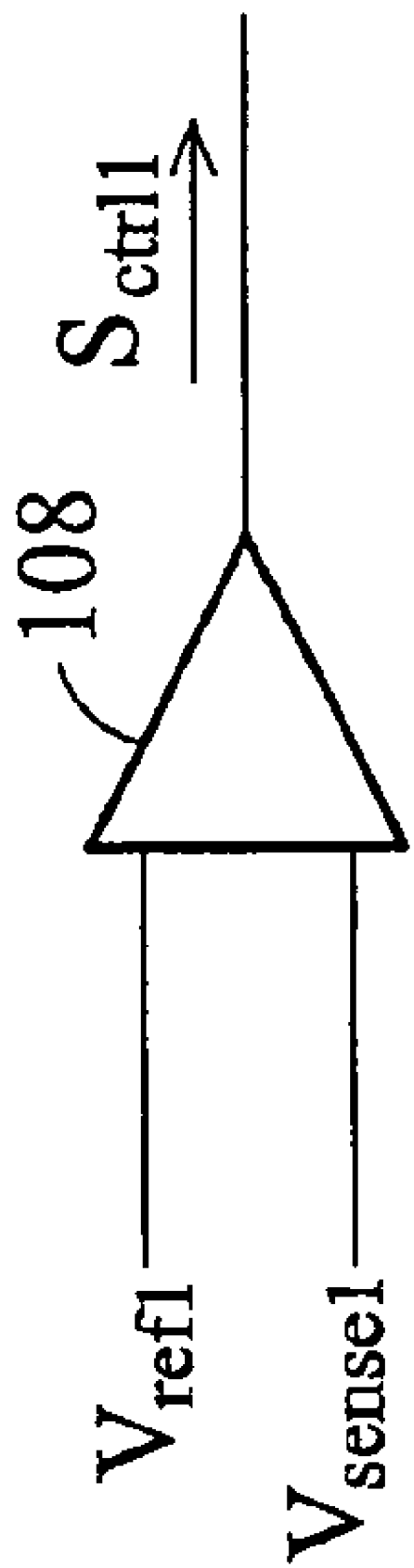
FIG. 5 illustrates another way to generate a control signal in a power control device according to another embodiment of invention.

After obtaining the sensed current of each converter channel, power control device 104 generates the control signals $S_{cntrl1} \sim S_{ctrlN}$ according to the respective or total sensed current of each converter channel. According to one embodiment of the invention, the sensed current of each converter channel is compared with a reference current and a compared result is obtained as the control signal, wherein the reference current could be a fixed or an adjustable one according to the applications. FIG. 4A illustrates an exemplary circuit for generating the control signal of the power control device 104 according to one embodiment of the invention. As shown in FIG. 4A, the sensed current $I_{sense1}$ of the first converter channel, which is taken here as an example and should not be limited thereto, is compared with a reference current $I_{ref1}$. When the sensed current $I_{sense1}$ is larger than the reference current $I_{ref1}$, the voltage at node $N_C$ will be pulled down to the ground, and when the sensed current $I_{sense1}$ is smaller than the reference current $I_{ref1}$, the voltage at node $N_C$ will be pulled up to the voltage VDD. The node $N_C$ is further coupled to a logic device 106 for outputting the control signal $S_{ctrl1}$. According to one embodiment of the invention, the logic device 106 can be an inverter 107 as shown in FIG. 4B for outputting the control signal $S_{ctrl1}$. Thus, for example, when the sensed current $I_{sense1}$ is larger than the reference current $I_{ref1}$, the voltage at node $N_C$ will be pulled down to the ground (logic low). Next, the of inverter 107 inverts the logic low signal at node $N_C$ to a logic high signal as the control signal $S_{ctrl1}$ for indicating that the sensed current $I_{sense1}$ is larger than the reference current $I_{ref1}$. Since it is known in the Art that the current can be transferred to a corresponding voltage, the power control device 104 can also generate the control signals $S_{ctrl1} \sim S_{ctrlN}$ according to the respective or total sensed inductor voltage of each converter channel. FIG. 5 illustrates another way to generate a control signal in a power control device 104 according to another embodiment of invention. As shown in FIG. 5, the sensed voltage $V_{sense1}$ of the first converter channel, which is taken here as an example and should not be limited thereto, is compared with a reference voltage $V_{ref1}$, wherein the reference voltage could be a fixed or an adjustable reference voltage according to application. When the sensed voltage $V_{sense1}$ is larger than the reference voltage $V_{ref1}$, the comparator 108 outputs a logic value, for example, a logic high signal as the control signal $S_{ctrl1}$. Alternatively, when the sensed voltage $V_{sense1}$ is smaller than the reference voltage $V_{ref1}$, the comparator 108 outputs a logic low signal as the control signal $S_{ctrl1}$. Thus, the logic level of the control signal $S_{ctrl1}$ can be viewed as an indicator for turning on or off the respective converter channel.

Figure 6A:
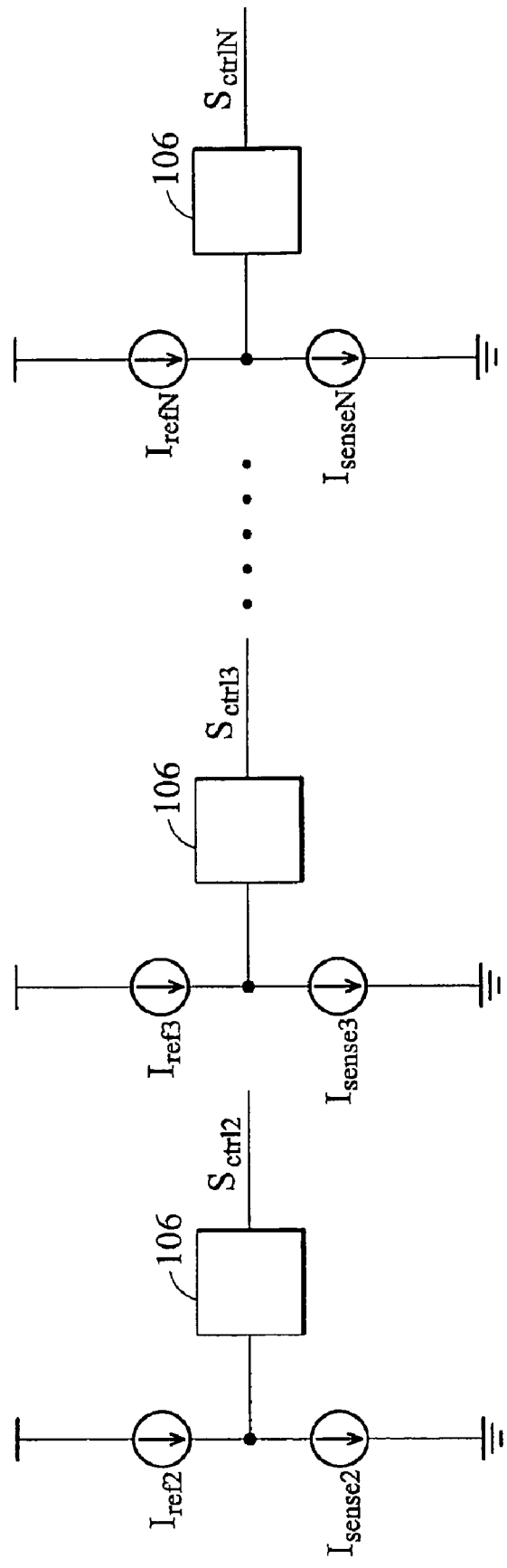
FIG. 6A illustrates an exemplary comparing circuit in a power control device according to one embodiment of the invention.
Figure 6B:
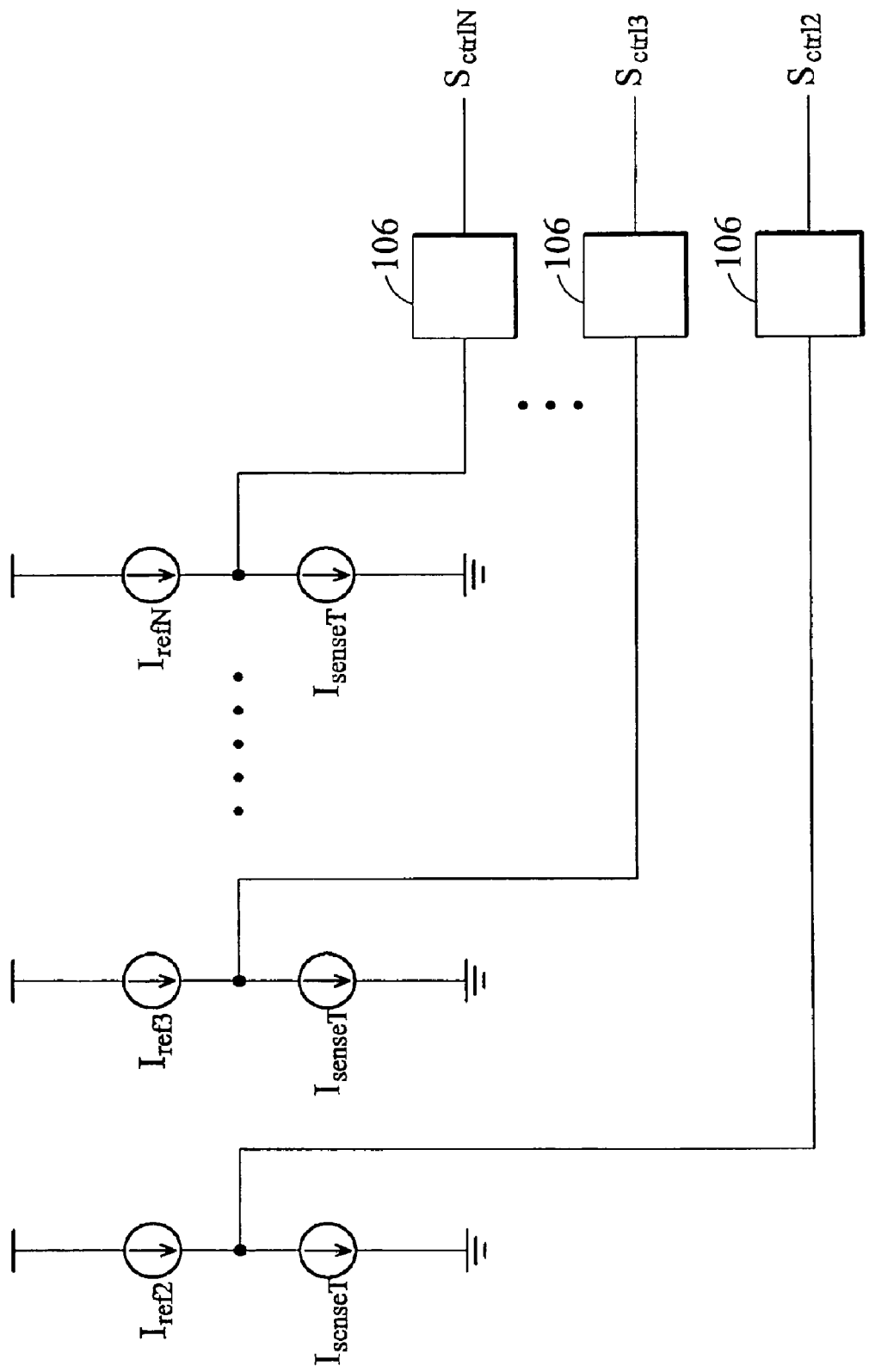
FIG. 6B illustrates another exemplary comparing circuit in a power control device according to another embodiment of the invention.

FIGS. 4A, 4B and 5 taking the first converter channel for illustration, however, it should be noted that the invention should not be limited thereto and the scope of the present invention shall be defined and protected by their equivalents. In some embodiments of the invention, the inductor currents of each converter channel are sensed and the control signals $S_{ctrl1} \sim S_{ctrlN}$ of each converter channel will be generated to dynamically control the on/off of each converter channel. Thus, the on/off of each converter channel can be controlled flexibly and independently according to the respective loading current of each converter channel. While in other embodiments of the invention, some of the converter channel could be selectively not controlled by the power control device 104 and thus, will be always kept on regardless of the loading. And in yet some other embodiments of the invention, some of the sensed currents/voltages will be summed together to generate the control signals. FIGS. 6A and 6B illustrate two exemplary structures for generating the control signals in a power control device according to the embodiments of the invention. FIG. 6A illustrates an exemplary comparing circuit structure in a power control device 104A according to one embodiment of the invention. As shown in FIG. 6, except for the first converter channel, the sensed current $I_{sense2} \sim I_{senseN}$ in the second converter channel to the $N^{th}$ converter channel are respectively compared with the reference currents $I_{ref2} \sim I_{refN}$, and the control signals $S_{ctrl2} \sim S_{ctrl2N}$ are generated, accordingly. The reference currents could be fixed or adjustable according to application. Alternatively, the reference current $I_{ref2} \sim I_{refN}$ can all be the same or be different with some step value. For example, the reference currents $I_{ref2} \sim I_{refN}$ can all be adjustable, or all be chosen as 10 uA, or can respectively be 10 uA, 20 uA, ... etc. when a step value is chosen as 10 uA. FIG. 6B illustrates another exemplary comparing circuit structure in a power control device 104B according to another embodiment of the invention. In this embodiment, the sensed currents are summed together to get a total sensed current $I_{senseT}$, and the total sensed current $I_{senseT}$ is compared with the reference currents $I_{ref2} \sim I_{refN}$ and the control signals $S_{ctrl2} \sim S_{ctrl2N}$ are generated, accordingly. A step value can be chosen as 10 uA, and the reference currents can respectively be 10 uA, 20 uA, . . . etc. In this way, the current range of the total sensed current $I_{senseT}$ can be detected and the number of converter channels to be turned on can thus be decided according to the detected result. As illustrate above, the sensed current can also be transformed to the sensed voltage and the comparing circuit structures shown in FIGS. 6A and 6B can also be applied.

Figure 8:
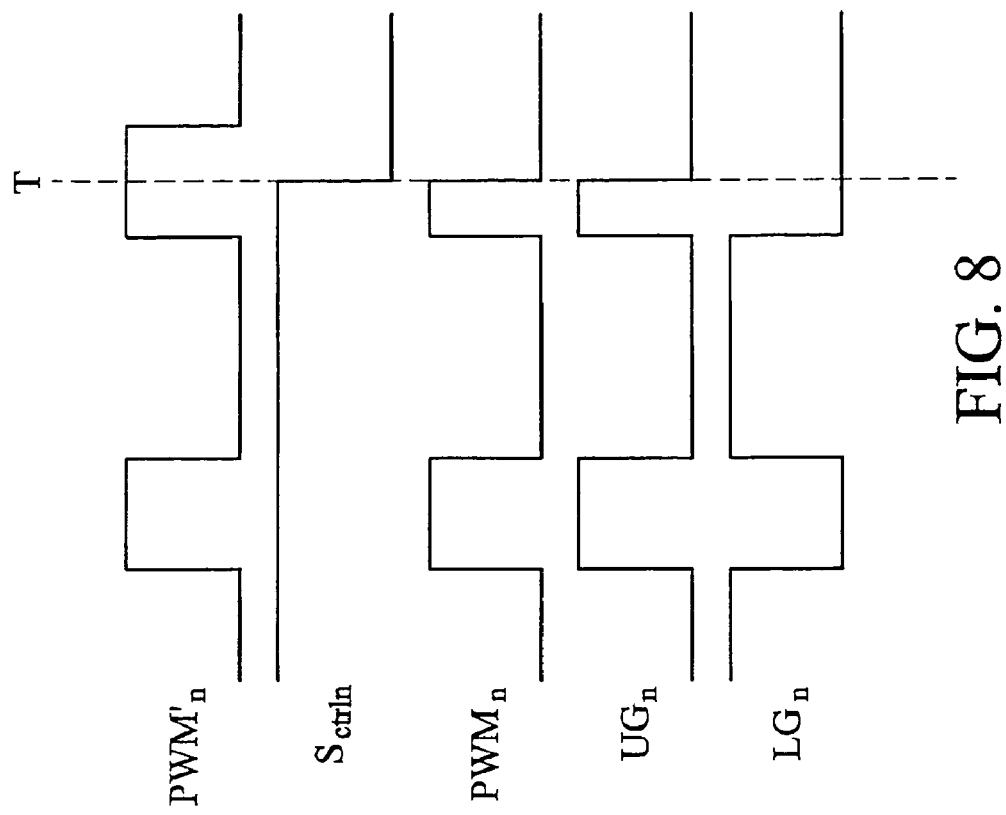
FIG. 8 illustrates resulting waveforms according to the embodiment of the invention.
Figure 7:
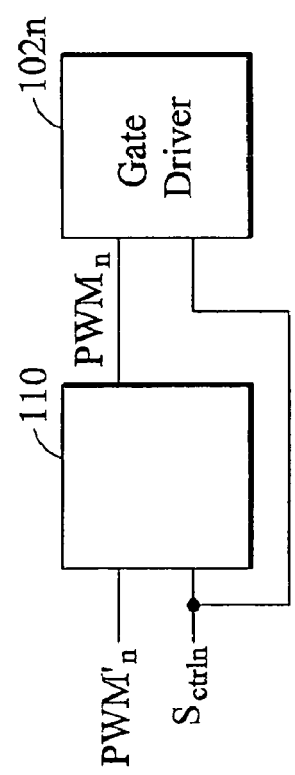
FIG. 7 illustrates an exemplary circuit adopted in a channel control device for controlling the PWM signals according to one embodiment of the invention.

After generating the control signals, the power control device 104 outputs the control signals as the indicator to enable or disable the PWM signals applied to each converter channel. FIG. 7 illustrates an exemplary circuit adopted in channel control device 101 for controlling the PWM signals according to one embodiment of the invention. Taking the $n^{th}$ converter channel as an example, wherein n=1~N, the control signal $S_{ctrln}$ of the $n^{th}$ converter channel and the original PWM signal $PWM'_n$ of the $n^{th}$ converter channel generated by the channel control device 101 are further inputted to a logic device 110 before applied to the gate driver 102n. In the embodiment, the logic device is an AND logic used to enable or disable the original PWM signals before being applied to each converter channel. The main concept of the logic operation of logic 110 is to disable the original PWM signal $PWM'_n$ through a logic low signal (logic 0). FIG. 8 illustrates resulting waveforms according to the embodiment of the invention. Note that it is assumed that the control signal $S_{ctrln}$ with logic low is used to represent that a sensed current is smaller than the reference current. Thus, as shown in FIG. 8, when the control signal $S_{ctrln}$ is changed from the logic high to the logic low at time T, it means that the loading of the $n^{th}$ converter channel now is light and the $n^{th}$ converter channel is going to be turned off. Thus, the output adjusted PWM signal $PWM_n$ is turned off after time T as shown in FIG. 8. In this way, the first PWM control signal $UG_n$ of the $n^{th}$ converter channel, which is with the same phase as the adjusted PWM signal $PWM_n$, is turned off after time T. In addition, the second PWM control signal $LG_n$ of the $n^{th}$ converter channel is also turned off after time T so as to completely turn off the $n^{th}$ converter channel. In this way, the gate driver 102n may synchronously turns off the first transistor and the second transistor according to the control signal. The operation of turning off the second PWM control signal can be implemented by the gate driver 102n or by any other specific logic circuit according to the received control signal via an AND operation. Since it is known in the Art that there are plenty of methods to control the on/off of the PWM signal, it should be understood that the invention is not limited to the above circuit and the scope of the present invention shall be defined and protected by their equivalents.

Figure 10:
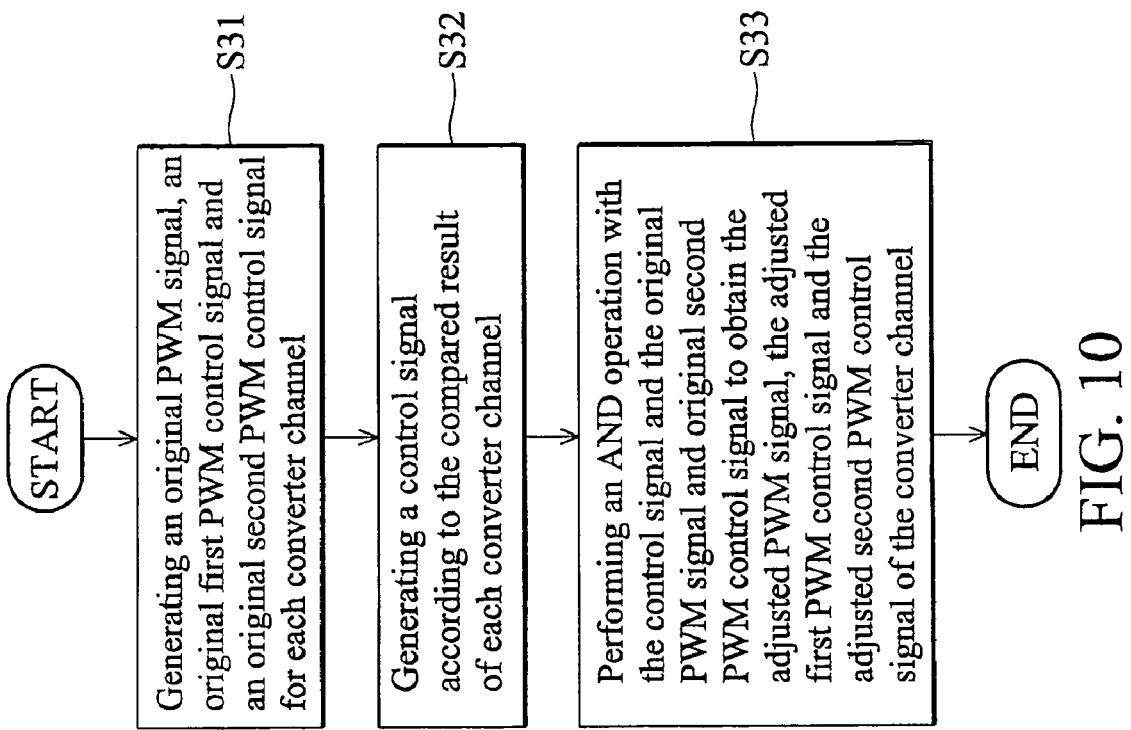
FIG. 10 illustrates a detailed flow chart when generating the adjusted PWM signal, the adjusted first PWM control signal and the adjusted second PWM control signal according to the embodiment of the invention.
Figure 9:
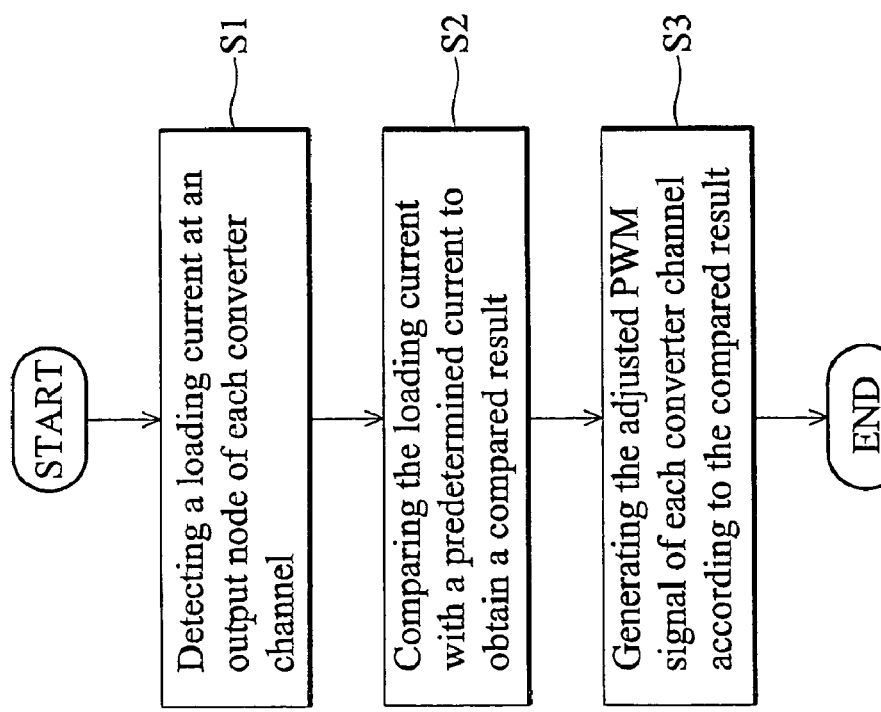
FIG. 9 illustrates a flow chart of the method for controlling operation of a multi-phase DC-DC controller according to the embodiment of the invention.

FIG. 9 illustrates a flow chart of the method for controlling operation of a multi-phase DC-DC controller according to the embodiment of the invention. First, a loading current at an output node of each converter channel is detected (Step S1). Next, the loading current is compared with a predetermined current to obtain a compared result (Step S2). Finally, the adjusted PWM signal of each converter channel is generated according to the compared result (Step S3). According to the embodiment of the invention, the switch device may turn off the converter channel via an adjusted first PWM control signal and an adjusted second PWM control signal according to the adjusted PWM signal and a control signal when the loading current does not exceed the predetermined current. FIG. 10 illustrates a detailed flow chart when generating the adjusted PWM signal, the adjusted first PWM control signal and the adjusted second PWM control signal according to the embodiment of the invention. First, an original PWM signal, an original first PWM control signal and an original second PWM control signal for each converter channel are generated (Step S31), wherein the original first PWM control signal is generated according to the original PWM signal so as to have the same phase as the original PWM signal, and wherein the original second PWM control signal is generated by inversing the original first PWM control signal so as to have inverse phase as original first PWM control signal. Next, a control signal is generated according to the compared result of each converter channel (Step S32). Finally, the adjusted PWM signal of the converter channel is obtained by performing an AND operation with the control signal and the original PWM signal, the adjusted first PWM control signal of the converter channel is obtained according to the adjusted PWM signal so as to have the same phase as the adjusted PWM signal, and the adjusted second PWM control signal of the converter channel is obtained by performing an AND operation with the control signal and the original second PWM control signal (Step S33).

While the invention has been described by way of example and in terms of preferred embodiment, it is to be understood that the invention is not limited thereto. Those who are skilled in this technology can still make various alterations and modifications without departing from the scope and spirit of this invention.

What is claimed is:

1. A multi-phase DC-DC controller, comprising:
  a plurality of converter channels, wherein each converter channel comprises a switch device, a first output node and an inductor coupled between the switch device and the first output node;
  a channel control device generating a plurality of adjusted pulse width modulation (PWM) signals according to a plurality of control signals of the converter channels to respectively control operation of the switch device in each converter channel; and
  a power control device generating the control signals according to a plurality of sensed currents in the converter channels so as to dynamically turn on or off each converter channel according to the sensed currents.

2. The multi-phase DC-DC controller as claimed in claim 1, wherein each converter channel further comprises a sensing device coupled to the inductor to sense the current flowing through the inductor and generate the sensed current, correspondingly.

3. The multi-phase DC-DC controller as claimed in claim 2, wherein each sensing device comprises:
  a first resistor coupled to one terminal of the inductor;
  a first capacitor coupled between the first resistor and the first output node;
  an optional amplifier comprising a first input node, a second input node and a second output node, wherein the first input node is coupled to a second connection node of the first resistor and the first capacitor, and the second input node is coupled to the second output node; and
  a second resistor coupled between the second input node and the first output node, wherein the sensed current is generated according to the current flowing through the second resistor.

4. The multi-phase DC-DC controller as claimed in claim 2, wherein the sensing devices comprise:
  an optional amplifier comprising a first input node, a second input node and a second output node, wherein the first input node is coupled to a ground node, and the second input node is coupled to the second output node; and
  a sensing resistor coupled between the second input node and a third connection node of the inductor and the switch device, wherein the sensed current is generated according to the current flowing through the sensing resistor.

5. The multi-phase DC-DC controller as claimed in claim 1, wherein each converter channel further comprises a sensing device coupled to the inductor to sense the voltages across the inductor and generate the sensed current, correspondingly.

6. The multi-phase DC-DC controller as claimed in claim 1, wherein the switch device in each converter channel further comprises a first transistor and a second transistor coupled in serial between a reference voltage and a ground node, and wherein the inductor is coupled to a first connection node of the first transistor and the second transistor.

7. The multi-phase DC-DC controller as claimed in claim 6, wherein each converter channel further comprises a gate driver receiving and enhancing the adjusted PWM signal of the converter channel, and outputting a first PWM control signal to the first transistor and a second PWM control signal to the second transistor, correspondingly, to control operations of the first transistor and the second transistor.

8. The multi-phase DC-DC controller as claimed in claim 6, wherein each gate driver further receives the control signal of the converter channel and synchronously turns off the first transistor and the second transistor according to the control signal.

9. The multi-phase DC-DC controller as claimed in claim 1, wherein the power control device compares the sensed current of each converter channel with a predetermined reference current to obtain a compared result, and generates the control signal of each converter channel according to the compared result.

10. The multi-phase DC-DC controller as claimed in claim 1, wherein the channel control device further generates an original PWM signal for each converter channel, and generates the adjusted PWM signal according to the original PWM signal and the control signal of the converter channel.

11. The multi-phase DC-DC controller as claimed in claim 10, wherein the adjusted PWM signal of each converter channel is generated by performing an AND operation with the original PWM signal and the control signal of the converter channel.

12. The multi-phase DC-DC controller as claimed in claim 1, wherein the power control device further sums up the sensed currents in the converter channels to obtain a total sensed current, compares the total sensed current with a predetermined reference current to obtain a compared result, and generates the control signal of each converter channel according to the compared result.

13. A multi-phase DC-DC controller, comprising:
a first converter channel comprising a first switch device, a first output node and a first inductor coupled between the first switch device and the first output node;
a second converter channel comprising a second switch device, a second output node and a second inductor coupled between the second switch device and the second output node;
a first sensing device coupled to the first converter channel to sense a first current at the first output node;
a second sensing device coupled to the second converter channel to sense a second current at the second output node;
a channel control device generating a first adjusted pulse width modulation (PWM) signal according to a first control signal to control operation of the first switch device, and generating a second adjusted PWM signal according to a second control signal to control operation of the second switch device; and
a power control device generating the first control signal according to the first current and generating the second control signal according to the second current so as to dynamically turn on or off the first converter channel and the second converter channel according to the first and second sensed currents.

14. The multi-phase DC-DC controller as claimed in claim 13, wherein the first sensing device is coupled to the first inductor to sense a current flowing through the first inductor and generate the first current, correspondingly.

15. The multi-phase DC-DC controller as claimed in claim 13, wherein the first switch device comprises a first transistor and a second transistor coupled in serial between a reference voltage and a ground node, and wherein the first inductor is coupled to a first connection node of the first transistor and the second transistor.

16. The multi-phase DC-DC controller as claimed in claim 15, wherein the first converter channel further comprises a first gate driver receiving and enhancing the first adjusted PWM signal, and outputting a first PWM control signal to the first transistor and a second PWM control signal to the second transistor, correspondingly, to control operations of the first transistor and the second transistor.

17. The multi-phase DC-DC controller as claimed in claim 15, wherein the first gate driver further receives the first control signal and synchronously turns off the first transistor and the second transistor according to the first control signal.

18. The multi-phase DC-DC controller as claimed in claim 13, wherein the first sensing device comprises:
a first resistor coupled to one terminal of the first inductor;
a first capacitor coupled between the first resistor and the first output node;
an optional amplifier comprising a first input node, a second input node and a third output node, wherein the first input node is coupled to a second connection node of the first resistor and the first capacitor, and the second input node is coupled to the third output node; and
a second resistor coupled between the second input node and the first output node, wherein the first current is generated according to the current flowing through the second resistor.

19. The multi-phase DC-DC controller as claimed in claim 13, wherein the first sensing devices comprise:
an optional amplifier comprising a first input node, a second input node and a third output node, wherein the first input node is coupled to a ground node and the second input node is coupled to the third output node; and
a sensing resistor coupled between the second input node and a third connection node of the first inductor and the first switch device, wherein the first current is generated according to the current flowing through the sensing resistor.

20. The multi-phase DC-DC controller as claimed in claim 13, wherein the power control device compares the first current with a first predetermined reference current to obtain a first compared result and generates the first control signal according to the first compared result, and compares the second current with a second predetermined reference current to obtain a second compared result and generates the second control signal according to the second compared result.

21. The multi-phase DC-DC controller as claimed in claim 13, wherein the channel control device further generates a first original PWM signal for the first converter channel and a second original PWM signal for the second converter channel, generates the first adjusted PWM signal according to the first original PWM signal and the first control signal, and generates the second adjusted PWM signal according to the second original PWM signal and the second control signal.

22. The multi-phase DC-DC controller as claimed in claim 21, wherein the first adjusted PWM signal is generated by performing an AND operation with the first original PWM signal and the first control signal, and the second adjusted PWM signal is generated by performing an AND operation with the second original PWM signal and the second control signal.

23. The multi-phase DC-DC controller as claimed in claim 13, wherein the power control device further sums up the first current and the second current to obtain a total sensed current, compares the total sensed current with a predetermined reference current to generate a compared result, and generates the first control signal and the second control signal according to the compared result.

24. A method for controlling operation of a multi-phase DC-DC controller, wherein the multi-phase DC-DC controller comprises a power control device and a plurality of converter channels turning on or off according to a plurality of adjusted pulse width modulation (PWM) signals, respectively, comprising:

detecting a loading current at an output node of each converter channel and applying the loading current to the power control device;

comparing the loading current with a predetermined current to obtain a compared result and generating a control signal according to the compared result of each converter channel by the power control device;

generating an original PWM signal for each converter channel; and combining the original PWM signal with the control signal to generate the adjusted PWM signal of each converter channel.

25. The method as claimed in claim 24, wherein each converter channel comprises a switch device receiving the adjusted PWM signal and an inductor coupled between the switch device and the output node, and the detection of the loading current is performed by sensing the current flowing through the inductor, and the switch device turns off the converter channel via an adjusted first PWM control signal and an adjusted second PWM control signal according to the adjusted PWM signal when the loading current does not exceed the predetermined current.

26. The method as claimed in claim 24, further comprising:

generating an original first PWM control signal and an original second PWM control signal for each converter channel, wherein a phase of the original first PWM control signal is the same as a phase of the original PWM signal and is inverse to a phase of the original second PWM control signal; and performing an AND operation with the control signal and the original PWM signal and original second PWM control signal to obtain the adjusted PWM signal, the adjusted first PWM control signal and the adjusted second PWM control signal of the converter channel.

* * * * *